United States Patent [19]

Chinomi et al.

[11] Patent Number: 4,969,688
[45] Date of Patent: Nov. 13, 1990

[54] VEHICULAR SEAT

[75] Inventors: Isamu Chinomi; Yuji Tanaka; Shinzi Arakawa, all of Kanagawa, Japan

[73] Assignee: Ikeda Bussan Co., Ltd., Ayase, Japan

[21] Appl. No.: 379,746

[22] Filed: Jul. 14, 1989

[30] Foreign Application Priority Data

Sep. 21, 1988 [JP] Japan .................. 63-123885[U]

[51] Int. Cl.⁵ .................. A47C 1/024; B60N 1/06
[52] U.S. Cl. .................. 297/460; 297/452
[58] Field of Search ............ 297/354, 355, 452, 445, 297/457, 460

[56] References Cited

U.S. PATENT DOCUMENTS 4,796,954  1/1989  Saito .................. 297/452
4,804,225  2/1989  Fourrey .............. 297/354 X

FOREIGN PATENT DOCUMENTS 0061967  10/1982  European Pat. Off. .
1091123  11/1967  United Kingdom .
2200838  8/1988  United Kingdom .

Primary Examiner—Peter R. Brown
Attorney, Agent, or Firm—Foley & Lardner, Schwartz, Jeffery, Schwaab, Mack, Blumenthal & Evans

[57] ABSTRACT

A vehicular seat is disclosed, which comprises a seat portion, a seatback portion and a reclining device for varying an angular position of the seatback portion relative to the seat portion. The seatback portion includes a rectangular frame which has a lower horizontal portion bent rearward with respect to a major portion of the frame.

4 Claims, 2 Drawing Sheets

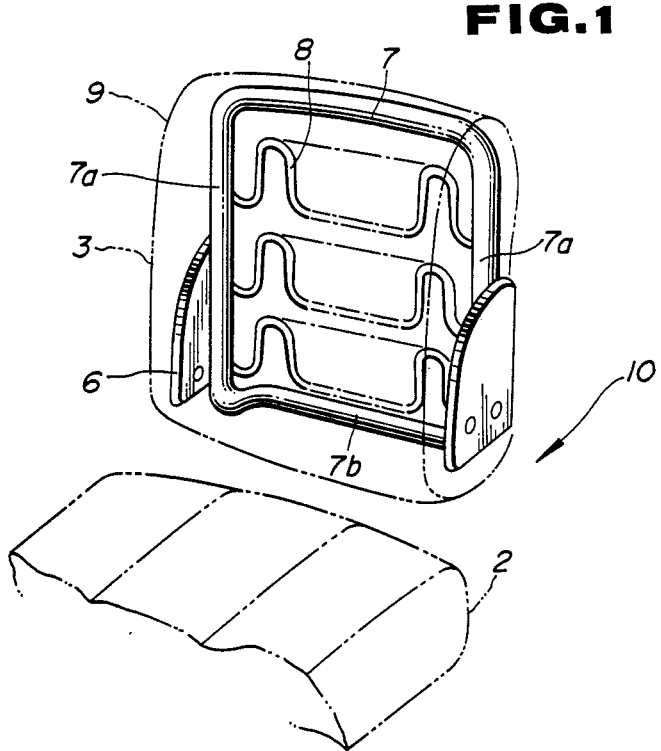
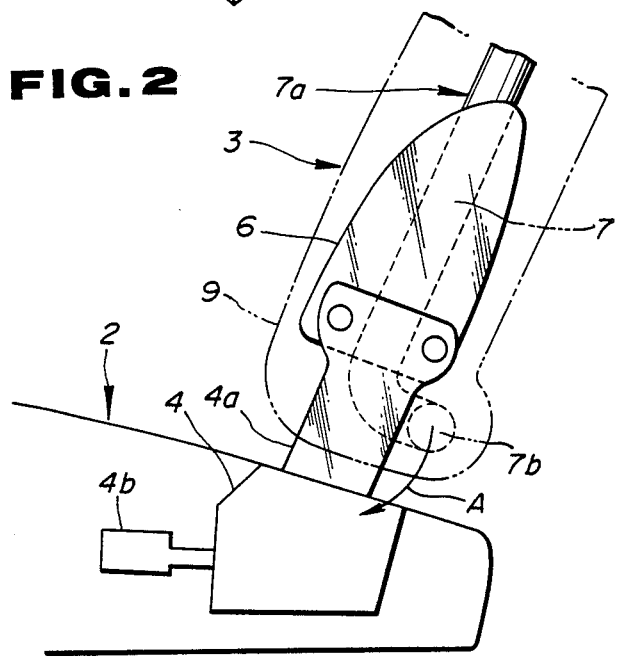

VEHICULAR SEAT

BACKGROUND OF THE INVENTION

1. Field of the Invention

The present invention relates in general to seats, and more particularly, to vehicular seats of a reclining type which comprises a seat portion, a seatback portion and a reclining device.

2. Description of the Prior Art

In order to clarify the task of the present invention, one conventional vehicular seat of the reclining type will be outlined with reference to Fig. 3 of the accompanying drawings.

The vehicular seat 1 comprises generally a seat portion 2, a seatback portion 3 and a reclining device 4.

The seatback portion 3 comprises a rectangular seatback frame 5 constructed of metal pipe, side metal plates 6 secured to side portions 5a of the frame 5, a plurality of S-shaped springs 8 extending between the side portions 5a of the frame 5 and a rectangular cushion pad 9 covering the entire of the frame assembly.

The reclining device 4 functions to vary the angular position of the seatback portion 3 relative to the seat portion 2. The device 4 shown in the drawing comprises two arms 4a (only one is shown) which are secured to the side metal plates 6 and pivotally connected to the seat portion 2 through known pivot mechanisms. A latch mechanism controllable by a handle 4b is incorporated with one of the pivot mechanisms for latching the seatback portion 3 at a desired angular position relative to the seat portion 2.

However, the conventional vehicular seat 1 as described hereinabove has the following drawback due to its inherent construction.

That is, when a person sits on the seat 1 with his back in contact with the seatback portion 3, his lumbar portion is uncomfortably pressed by a lower part of the seatback portion 3. This undesired phenomenon becomes much severe when the seatback portion 3 assumes a largely backward inclined position. This is because of presence of the lower horizontal portion 5b of the rectangular seatback frame 5, which swings forward upon backward inclination of the seatback portion 3.

Furthermore, due to restriction in function and design of the reclining device 4, there is a limit in increasing the thickness of the cushion pad 9 at the area which covers the lower horizontal portion 5b of the seatback frame 5.

SUMMARY OF THE INVENTION

It is therefore an object of the present invention to provide a vehicular seat which is free of the above-mentioned drawbacks.

According to the present invention, there is provided a vehicular seat whose seatback frame has a lower horizontal portion bent rearward.

According to the present invention, there is provided a vehicular seat which comprises a seat portion, a seatback portion and a reclining device for varying an angular position of the seatback portion relative to the seat portion, wherein the seatback portion includes a rectangular frame which has a lower horizontal portion bent rearward with respect to a major portion of the frame.

BRIEF DESCRIPTION OF THE DRAWINGS

Other objects and advantages of the present invention will become apparent from the following description when taken in conjunction with the accompanying drawings, in which:

FIG. 1 is a perspective view of a seatback portion of a according to the present invention, with a cushion pad thereof removed;

FIG. 2 is an enlarged, but schematically illustrated view of an essential portion of the vehicular the invention.

DETAILED DESCRIPTION OF THE INVENTION

Figure 3:
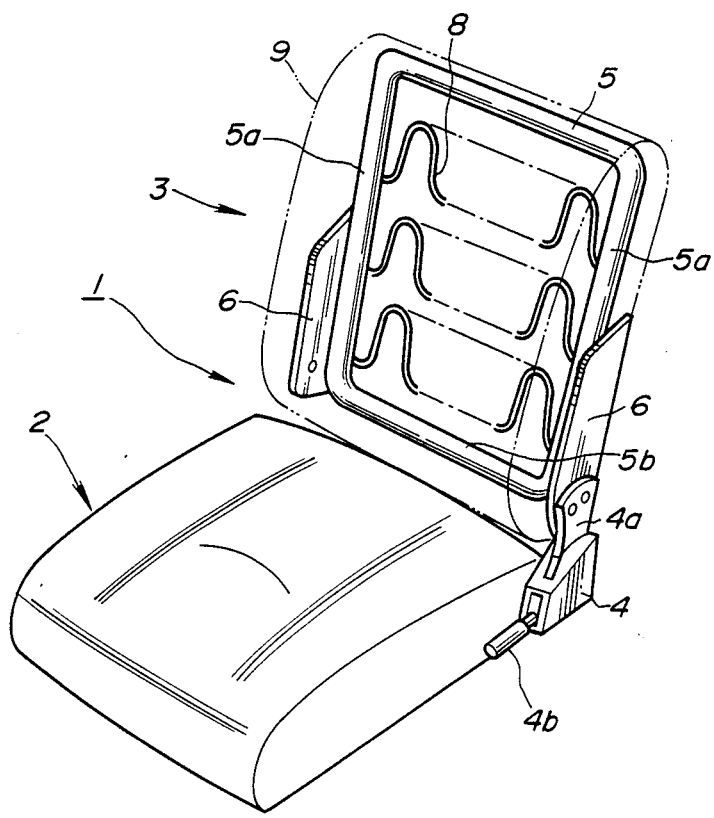
FIG. 3 is a perspective view of a conventional vehicular seat.

Referring to FIGS. 1 and 2, there is shown a vehicular seat according to the present invention, which is generally designated by numeral 10.

As will be seen from FIG. 1, the seat 10 comprises a seat portion 2, a seatback portion 3 and a reclining device 4 (see FIG. 2). The seat portion 2 and the reclining device are the same as those of the above-mentioned conventional seat 1.

The seatback portion 3 comprises a rectangular seatback frame 7 constructed of metal pipe, side metal plates 6 secured to side portions 7a of the frame 7, a plurality of S-shaped springs 8 extending between the side portions 7a of the frame 7 and a rectangular cushion pad 9 covering the entire of the frame assembly.

As is best shown in FIG. 2, in the invention, a lower horizontal portion 7b of the frame 7 is bent rearward with respect to a major portion of the frame 7. In other words, the lower horizontal portion 7b of the frame 7 is bent away from the seat portion 2. This means that the distance between the lower horizontal portion 7b and the lumbar portion of a seat occupant is increased as compared with the above-mentioned conventional seat 1.

Thus, even when the seatback portion 3 is largely inclined backward, the forward movement of the lower horizontal portion 7b of the frame 7 has substantially no effect on pressing the lumbar portion of a seat occupant. This will be understood from the arrow "A" of FIG. 2, which shows the direction in which the lower horizontal portion 7b travels upon backward inclination of the seatback portion 3. Furthermore, due to the rearward bending of the lower horizontal portion 7b, much thicker cushion pad 9 can be used for covering the front of the lower horizontal portion 7b.

Thus, the vehicular seat 10 according to the present invention can give a seat occupant a comfortable sitting feeling.

What is claimed is:

1. A vehicular seat comprising:
    a seat portion;
    a seatback portion; and
    a reclining device mounted between the seat portion and seatback portion for varying an angular position of said seatback portion relative to said seat portion,
    wherein said seatback portion includes a substantially rectangular frame consisting of a single tube formed in a loop to define said frame wherein a lower horizontal portion is bent rearward with respect to a major portion of said frame.

2. A vehicular seat as claimed in claim 1, further comprising:
   a plurality of S-shaped springs extending between lateral side portions of said frame; and
   such that said side portions extend side plates secured to said later side between two securing means and located on each of said side plates respectively, said side plates being secured to pivotal arms which constitute part of said reclining device.

3. A vehicular seat as claimed in claim 2, in which each of said side plates is secured to an outer side of the corresponding lateral side portion of said frame.

4. A vehicular seat as claimed in claim 3, further comprising a cushion pad which covers said frame, said cushion pad having a thicker portion at the area covering a front portion of the rearwardly bent lower horizontal portion.

* * * * *